Sept. 12, 1972     B. E. CURRAN ET AL     3,690,987
METHOD OF MAKING AN INSULATED BUILDING PANEL UNIT
Original Filed April 12, 1968     2 Sheets-Sheet 1
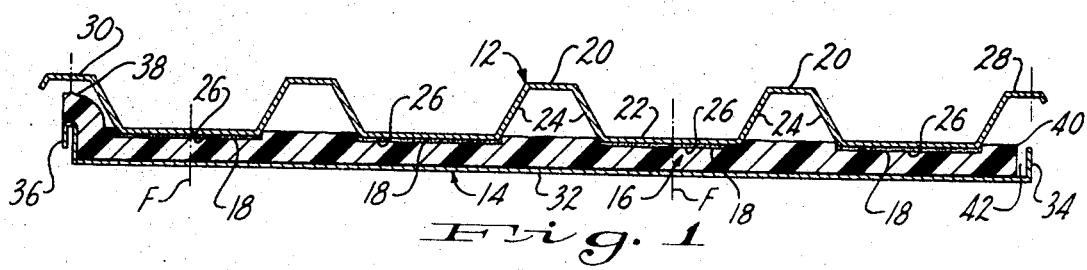
Fig. 1
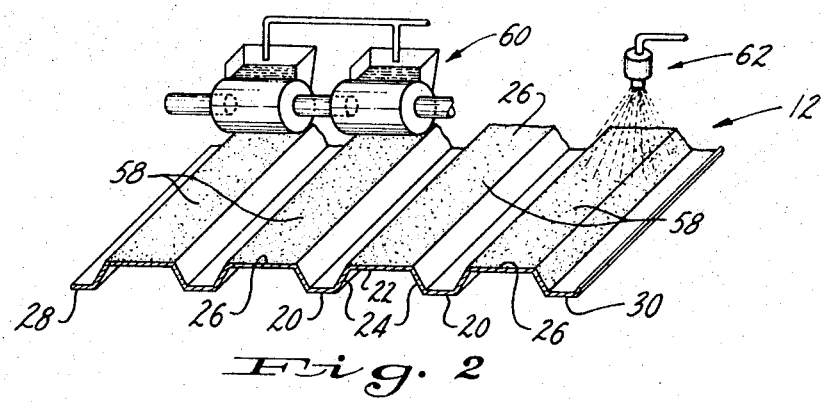
Fig. 2
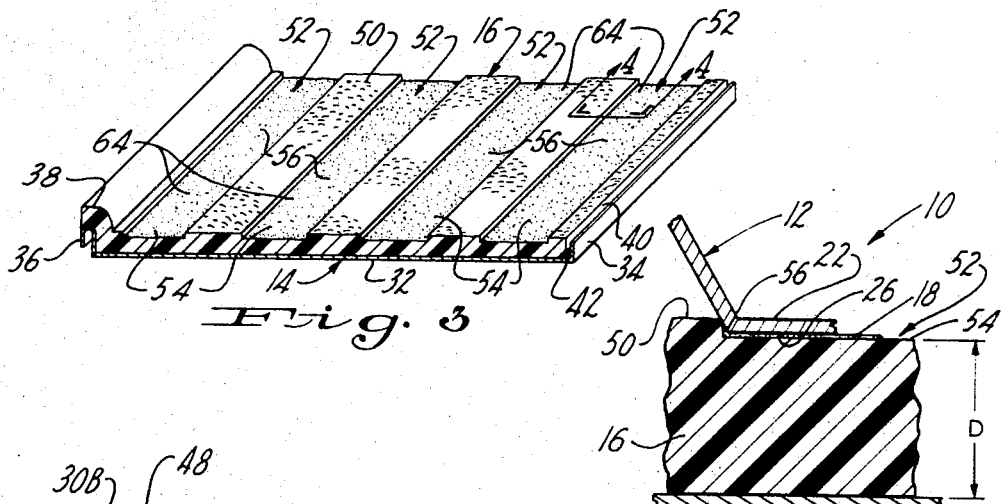
Fig. 3
Fig. 4
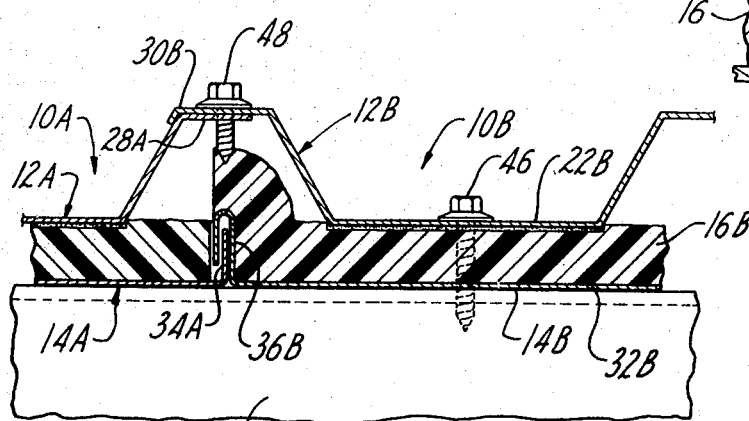
Fig. 5
INVENTORS
BERNARD E. CURRAN
RODNEY W. GARTNER
ROBERT G. LINDNER
BY George E. Manias
AGENT

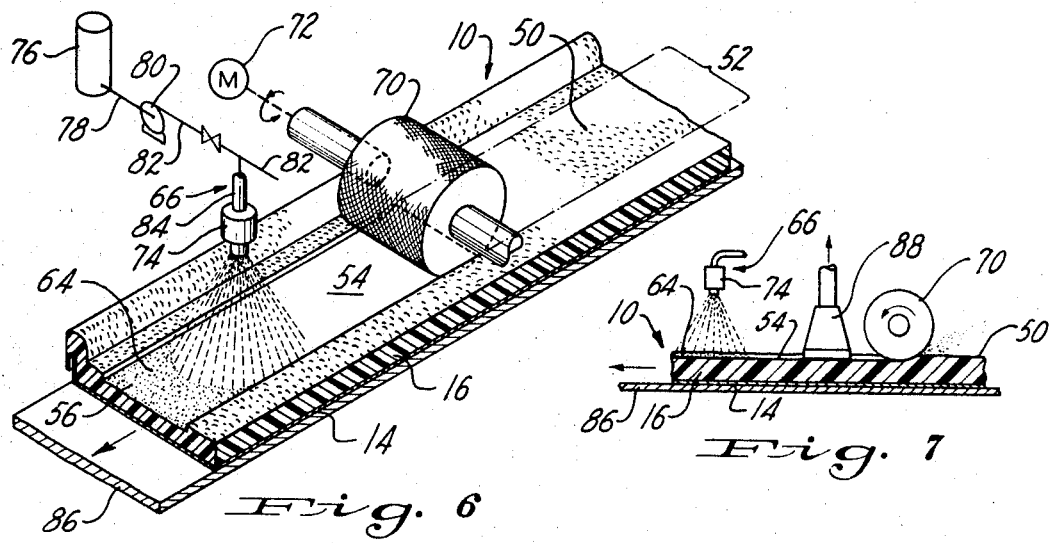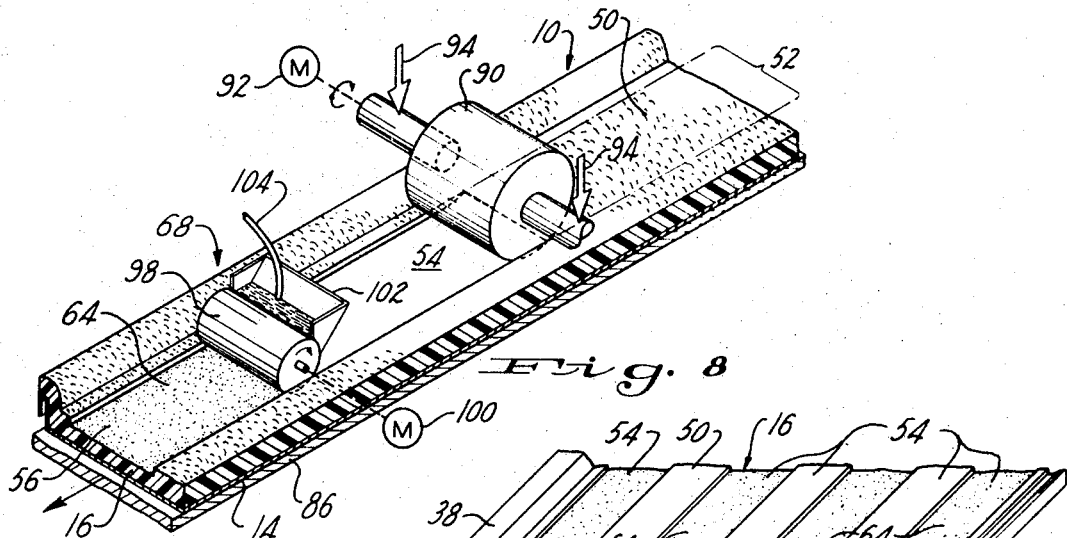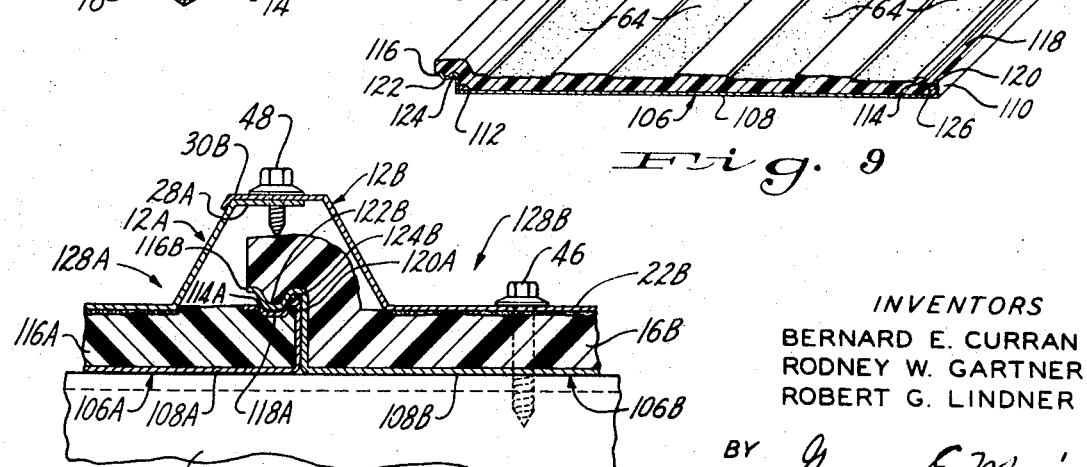

United States Patent Office 3,690,987
Patented Sept. 12, 1972

3,690,987
METHOD OF MAKING AN INSULATED BUILDING PANEL UNIT
Bernard E. Curran, Sewickley, Rodney W. Gartner, Coraopolis, and Robert G. Lindner, Sewickley, Pa., assignors to H. H. Robertson Company, Pittsburgh, Pa.
Original application Apr. 12, 1968, Ser. No. 720,909, now Patent No. 3,555,756, dated Jan. 19, 1971. Divided and this application Oct. 29, 1969, Ser. No. 872,029
Int. Cl. B32b 31/00
U.S. Cl. 156—257                    10 Claims

ABSTRACT OF THE DISCLOSURE

An insulated building panel unit consisting of a metal liner sheet, a layer of rigid foamed plastic material self-adhered to the liner sheet and a facing sheet adhesively secured to the layer of foamed plastic material. Selected regions of the surface of the foamed plastic material are modified to provide essentially flat surfaces for adhesive bonding with essentially flat surfaces of the facing sheet. A method is described for making the present insulated building panel unit.

CROSS-REFERENCES TO RELATED APPLICATIONS

This is a division of application Ser. No. 720,909, filed Apr. 12, 1968, now U.S. Pat. 3,555,756, issued Jan. 19, 1971, and assigned to the assignee of the present invention.

BACKGROUND OF THE INVENTION (1) Field of the invention

This invention relates to a method of making an insulated building panel unit of the type having a liner sheet and a facing sheet secured to a layer of foamed plastic material.

(2) Description of the prior art

Numerous types of insulated building panel units and methods of making them are described in the prior art. See for example, U.S. Pats. 3,062,337; 3,090,078; 3,166,-454; 3,174,887; 3,203,042; 3,254,464; 3,290,845; 3,311,-948. See also, Belgium Pat. 696,876. Such prior art panel units comprise a pair of facer sheets having a foam core disposed therebetween. The foam core is produced by introducing an actively foaming liquid mixture between the facer sheets and allowing the mixture to expand into contact with and to adhere to the opposed faces of the facer sheets. The facer sheets must be restrained to counteract the relatively high pressures produced by the expanding actively foaming liquid mixture. Apparatus employed to restrain the facer sheets include cumbersome and complex mold equipment, armored conveyors and the like.

The prior art also suggests the use of high strength edge rails in combination with an insulating core and facer sheets, for forming an insulated building panel unit. See for example, U.S. Pat. 3,113,401 which describes a panel unit wherein the facer sheets and the insulating core are secured together by a glue layer or by known dielectric welding and fusing methods depending on the materials from which the facer sheets and insulating core are made.

The major disadvantages of these prior art panel units are the high cost of the materials constituting the foam core; the high cost of the relatively complex equipment employed to produce the panel units; the relatively high costs associated with the operation of the complex equipment; and the relatively slow production rate at which panels are produced.

Such prior art panel units are intended to serve as building structural members wherein the foam core fills the entire space between the facer sheets and acts as a shear connecting core. The facer sheets serve as the compression and tension flanges of the panel in beam action. The foam core acts compositely with the facer sheets and transfers shear stresses from one sheet to the other. Hence, other essential considerations in the production of such prior art panel units include the strength of the bond between the foam core and the facer sheets; the humid-aging characteristics of the foam; and those physical properties of the foam, such as tensile strength, yield strength, compressive strength, shear strength and modulus of elasticity. Thus, it will be appreciated that the production of such prior art panel units requires extensive quality control procedures which add considerably to the overall cost of producing the panel units.

SUMMARY OF THE INVENTION

The principal object of this invention is to provide a method for making an insulated building panel unit.

Another object of this invention is to modify the foam surface of a foam core to provide essentially flat surfaces which space a facing sheet at a selected distance from a liner sheet and which provide a greater bonding area than does the normal textured foam surface.

A further object of this invention is to provide an insulated building panel wherein a facing sheet is secured to a foam core by means of a film of adhesive.

The present invention provides an insulated building panel unit consisting of a liner sheet having a rigid foam core or layer of foamed plastic material self-adhered to one face thereof, a corrugated facing sheet disposed in juxtaposition with a foam surface of the foam core, and a film of adhesive securing the facing sheet to the foam core.

In accordance with this invention, the foam core serves as thermal insulation. The rigid foam core also serves as a spacer member which maintains the facing sheet spaced from the liner sheet. However, contrary to the shear transferring functions of the foam core in prior art panel units, the present foam core does not act as a shear connector. Hence, in the present panel unit, only shear stresses of insignificant magnitude are transferred from one sheet to the other. Once the present panel unit is erected, the structural strength required of the panel unit is developed by the facing sheet.

Further in accordance with this invention, the facing sheet, the liner sheet and the foam core are combined as a structure which will retain its integrity at least until the structure is fastened to a building framework. The self-adherent bond between the liner sheet and the foam core, and the adhesive bond between the facing sheet and the foam core reliably but provisionally join the liner sheet, the facing sheet and the foam core to form a panel unit capable of withstanding handling during manufacturing, packaging, shipping and erection. These bonds are disregarded when the structural strength of the panel unit is determined, notwithstanding the fact that they may have substantial strength. Once the panel unit is fastened to a building framework, the structural strength required of the panel unit is developed by the facing sheet.

The present invention also provides a method of making the present insulated building panel unit which comprises the steps of applying film of adhesive to facing sheet surfaces of the facing sheet and to the foam surface. Thereafter, the facing sheet is placed on the layer of foamed plastic material to engage the adhesive on the facing sheet surfaces with the adhesive on the foam surface and thereby to secure the facing sheet to the layer of foamed plastic material.

Further in accordance with the present method, at least those regions of the foam surface opposite the facing sheet surfaces are modified by trimming or calendering to obtain essentially flat surfaces which correspond with the facing sheet surfaces and which are spaced from the liner sheet at a selected distance. The foam surface is modified prior to the application of the film of adhesive. The facing sheet, when adhesively secured to the layer of foamed plastic material, also will be spaced from the liner sheet by essentially the selected distance.

The benefits gained by producing an insulated building panel unit in accordance with the present invention include: the elimination of complex fabrication facilities; the elimination of great volumes of relatively expensive core filling; and avoidance of the panel bulging which occurs in prior art panel units. Nevertheless, the principal virtues of the use of foam are retained.

BRIEF DESCRIPTION OF THE DRAWINGS

FIG. 1 is a transverse cross-sectional view of one embodiment of the present insulated building panel unit;

FIG. 2 is a fragmentary isometric view of an inverted facing sheet having a film of adhesive applied thereto;

FIG. 3 is a fragmentary isometric view of a liner sheet having a layer of foamed plastic material applied thereto, illustrating modification of the foam surface in accordance with the present invention;

FIG. 4 is a fragmentary cross-sectional view taken substantially along the line 4—4 of FIG. 3, illustrating the adhesion of a facing sheet to the layer of foamed plastic material;

FIG. 5 is a fragmentary transverse cross-sectional view illustrating a pair of adjacent building panel units secured to the structural framework of a building;

FIG. 6 is a schematic isometric view illustrating one method of modifying the foam surface and applying the film of adhesive thereto;

FIG. 7 is a schematic longitudinal cross-sectional view of a liner sheet having a layer of foamed plastic material applied thereto, illustrating modification and cleaning of the foam surface and the application of a film of adhesive thereto;

FIG. 8 is a schematic isometric view, similar to FIG. 6, illustrating an alternative method of modifying the foam surface and applying the film of adhesive thereto;

FIG. 9 is a fragmentary isometric view, similar to FIG. 3, illustrating an alternative embodiment of a liner sheet having a layer of foamed plastic material applied thereto; and FIG. 10 is a fragmentary transverse cross-sectional view, similar to FIG. 5, illustrating a pair of adjacent building panel units incorporating the metal liner sheet and layer of foamed plastic material of FIG. 9.

DESCRIPTION OF THE PREFERRED EMBODIMENT(S)

Referring to FIG. 1, there is illustrated an insulated building panel unit 10 consisting of a facing sheet 12; a substrate including a rigid foam core 16 or layer of foamed plastic material self-adhered to a liner sheet 14— the foam core 16 being interposed between the facing sheet 12 and the liner sheet 14; and a film of adhesive 18 securing the facing sheet 12 to the foam core 16. It is to be understood that the thickness of the film of adhesive 18 is exaggereated in FIG. 1 for the purpose of illustration.

Referring to FIGS. 1 and 2, the facing sheet 12 is corrugated and presents alternating crests 20 and valleys 22 and inclined webs 24 connecting adjacent ones of the crests 20 and valleys 22. The valleys 22 of the facing sheet 12 present facing sheet surfaces 26 disposed opposite the foam core 16. The facing sheet 12 is provided with an overlapped edge portion 28 and an overlapping edge portion 30 along its opposite longitudinal edges.

Referring to FIGS. 1 and 3, the liner sheet 14 includes a generally flat web 32 having marginal connecting means, such as a male lip 34 and a female lip 36 provided along its opposite longitudinal edges. The foam core 16 is substantially coextensive in width and length with the liner sheet 14 and has foam edges 38, 40 along its opposite longitudinal edges. The foam edge 38 overlaps the female lip 36. The foam edge 40 is spaced inwardly from the male lip 34 to provide a longitudinal recess 42 for receiving a portion of the female lip 36 of a liner sheet of an adjacent panel unit.

The phase "foamed plastic material" used in describing the foam core 16, is intended to include those foamed-in-place thermal insulation materials produced from organic and inorganic constituents.

As illustrated in FIG. 5, the overall arrangement of the present panel unit is such that adjacent panel units 10A, 10B may be sequentially erected in side-by-side, interlocked and overlapped relation. The male lip 34A of the liner sheet 14A is received in the female lip 36B of the liner sheet 14B. Also, the overlapped edge portion 28A of the facing sheet 12A underlies the overlapping edge portion 30B of the facing sheet 12B and is in surface engagement therewith. Fasteners 46 (only one shown) secure the panel units 10A, 10B to a subgirt 44 which forms part of a building structural framework. The fastener 46 extends through the valley 22B of the facing sheet 12B, the foam core 16B and the web 32B of the liner sheet 14B into threaded engagement with the subgirt 44. The positions of the fasteners 46 relative to the panel unit 10 are indicated in FIG. 1 by the dash-dot lines F. Means, such as fasteners 48 (only one shown) are provided for securing the overlapped edge portion 28A to the overlapping edge portion 30B.

Referring to FIGS. 3 and 4, the foam core 16 presents a foam surface 50 which, in accordance with the present invention, is modified along at least those regions 52 which will subsequently be opposite to the facing sheet surfaces 26. The regions 52 are modified so as to provide essentially flat surfaces 54 corresponding with the facing sheet surfaces 26.

Specifically, the regions 52 are modified to provide grooves 56, FIGS. 3 and 4, extending longitudinally of the foam core 16. The aforesaid essentially flat surfaces 54 comprise the bottom surfaces of the grooves 56. In addition, the depth of the grooves 56 is such that the essentially flat surfaces 54 are spaced from the liner sheet 14 by a selected distance indicated at D in FIG. 4. The overall arrangement is such that the facing sheet 12, when secured to the foam core 16, will also be spaced from the liner sheet 14 by essentially the distance D.

Referring again to FIG. 2, the facing sheet surfaces 26 are provided with a film of adhesive 58 prior to engagement with the foam core 16. The adhesive 58 may be applied by any suitable means. For example, conventional roller coating apparatus illustrated schematically at 60 may be employed to apply the adhesive 58 solely to the facing sheet surfaces 26. Alternatively, conventional spray coating apparatus illustrated schematically at 62 may be employed to apply the adhesive 58 selectively to the surface 26.

Referring again to FIG. 3, the essentially flat surfaces 54 are provided with a film of adhesive 64 prior to receiving the coated facing sheet surfaces 26 of the facing sheet 12. The film of adhesive 64 may be applied by any suitable means, such as conventional spray coating apparatus illustrated schematically at 66 in FIG. 6, or conventional roller coating apparatus illustrated schematically at 68 in FIG. 8.

When the facing sheet 12 is placed on the foam core 16, the films of adhesive 58, 64 will unite to form the aforesaid film of adhesive 18 (FIG. 1) thereby securing the facing sheet 12 to the foam core 16 and to the liner sheet 14. Adhesives, such as a pressure sensitive adhesive, a reactive adhesive, for example epoxy compositions, polyurethane elastomers, polyesterurethanes, may be used in producing the present panel unit 10.

In accordance with the present method of making the insulated building panel unit 10, the regions 52 of the foam surface 50 may be modified by trimming the foam surface 50 to remove portions thereof, thereby to provide the grooves 56 having the essentially flat surfaces 54. See FIG. 6, wherein a fragment of the building panel unit 10 is shown passing beneath a trimming roll 70 which is driven by a motor 72 in the direction of the arrow. It is to be understood that a plurality of the trimming rolls 70 will be employed to provide the plural grooves 56 illustrated in FIG. 3, for example.

The panel unit 10 is moved past the trimming roll 70 beneath a nozzle 74 of the spray coating apparatus 66. The nozzle 74 receives a stream of adhesive, under pressure, from a storage tank 76 through an inlet conduit 78, a pump 80, an outlet conduit 82 and a branch conduit 84. The outlet conduit 82 extends to additional nozzles (not shown) positioned to apply adhesive to the remaining ones of the essentially flat surfaces 54.

The building panel unit 10 is supported on and conveyed by a suitable conveyor means schematically illustrated at 86. The trimming roll 70 is supported for vertical adjustment by means not shown whereby the essentially flat surface 54 produced thereby will be spaced from the liner sheet 14 at the selected distance D (FIG. 4). By driving the trimming roll 70 in a direction opposite to the direction of movement of the panel unit 10, the foam particles removed from the foam core 16 are discharged in a direction opposite to the movement of the panel unit 10. Means (not shown) may be provided for removing these foam particles.

Referring to FIG. 7, there is illustrated a suction head 88 which is positioned between the trimming roll 70 and the spray coating apparatus 66. The mouth of the suction head 88 is positioned closely adjacent to the newly created essentially flat surface 54. The suction head 88 provides a means for cleaning the essentially flat surface 54 to remove trimmings such as accumulated foam particles prior to applying the film of adhesive 64.

Further in accordance with the present method of making the building panel unit 10, the regions 52 of the foam surface 50 may be modified by calendering the foam surface 50 to provide the grooves 56 having the essentially flat surfaces 54. See FIG. 8, wherein a fragment of the building panel unit 10 is shown passing beneath a calendering roll 90 driven by a motor 92 in the direction of the arrow. It is to be understood that a plurality of the calendering rolls 90 will be employed to provide the plural grooves 56 illustrated in FIG. 3, for example.

The panel unit 10 is supported on and conveyed by conveyor means schematically illustrated at 86. The calendering roll 90 is supported for vertical adjustment whereby the essentially flat surface 54 produced thereby will be spaced from the liner sheet 14 by the selected distance D (FIG. 4).

Pressure is applied to the calendering roll 90 by means schematically illustrated by the arrows 94. As the panel unit 10 moves beneath the calendering roll 90, the normal textured foam surface 50 is compressed and thereby leveled to produce the essentially flat surface 54. Thereafter, the essentially flat surface 54 receives the film of adhesive 64. As schematically illustrated in FIG. 8, the film of adhesive 64 may be applied by the roller coating apparatus 68 which comprises a coating roll 98 driven by a motor 100 in the direction of the arrow, and a hopper 102 receiving a supply of adhesive from a supply conduit 104. The hopper 102 is arranged to deposit a film of the adhesive onto the coating roll for transfer to the essentially flat surface 54.

An alternative embodiment of the metal liner sheet and its use in the present insulated building panel unit are illustrated in FIGS. 9 and 10. Corresponding numerals will be employed to identify corresponding parts heretofore described.

In FIG. 9 there is shown a metal liner sheet 106 provided with a foam core 16. The metal liner sheet 106 includes a generally flat web 108 and upstanding side walls 110, 112 provided along the opposite longitudinal edges of the web 108. The metal liner sheet 106 additionally includes marginal connecting means, such as an inwardly extending flange 114 and an outwardly extending flange 116 formed integrally with the upstanding side walls 110, 112, respectively. The inwardly extending flange 114 is provided with a longitudinal well 118 and a sealant-penetrating lip 120. The outwardly extending flange 116 is provided with a longitudinal rib 122. A sealant material 124 is provided between the longitudinal rib 122 and the upstanding side wall 112.

The foam surface 50 of the foam core 16 is modified, in accordance with the present invention, so as to provide the essentially flat surfaces 54 which, in turn, receive a film of adhesive 64. The foam core 16 is substantially coextensive in width and length with the metal liner sheet 106 and includes foam edges 38 and 126. The foam edge 38 overlies and is flush with the outboard edge of the outwardly extending flange 116. The foam edge 126 underlies the inwardly extending flange 114 and abuts the upstanding side wall 110.

In accordance with the present invention, the metal liner sheet 106 and the foam core 16 are joined with a corrugated facing sheet (not shown) to form an insulated building panel unit.

Referring to FIG. 10, there are illustrated adjacent insulated building panel units 128A, 128B erected in side-by-side, interlocked and overlapped relation. The panel units 128A and 128B incorporate the metal liner sheets 106A, 106B. The outwardly extending flange 116B of the metal liner sheet 106B overlaps and is interlocked with the inwardly extending flange 114A of the metal liner sheet 106A. The sealant-penetrating lip 120A penetrates the sealant material 124B to provide an essentially weather tight seal between the adjacent metal liner sheet 106A, 106B. Also, the overlapped edge portion 28A of the facing sheet 12A underlies the overlapping edge portion 30B of the facing sheet 12B and is in surface engagement therewith. Fasteners 46 (only one shown) secure the panels 128A, 128B to the subgirt 44. The subgirt 44 forms part of a building structural framework. The fastener 46 extends through the valley 22B of the facing sheet 12B, the foam core 16B and the web 108B of the metal liner sheet 106B into threaded engagement with the subgirt 44. Fasteners 48 (only one shown) are provided to secure the overlapped edge portion 28A to the overlapping edge portion 30B.

We claim:

1. In the method of making an insulated building panel unit including the steps of providing a substrate of a rigid foamed plastic material self-adhered to a liner sheet, wherein said layer of foamed plastic material is substantially coextensive in width and length with said liner sheet and has an exposed foam surface; and providing a corrugated facing sheet having inwardly presented facing sheet surfaces, the improvement comprising the steps of:
of said facing sheet;
applying a film of adhesive to said facing sheet surfaces
applying a film of adhesive to said exposed foam surface; and
placing said facing sheet on said layer of foamed plastic material to contact the adhesive on said facing sheet surfaces with the adhesive on said exposed foam surface and thereby to secure said facing sheet to said layer of foamed plastic material.

2. The method of claim 1 wherein a film of adhesive is selectively applied only to those regions of said exposed foam surface opposite said facing sheet surfaces.

3. The method of claim 1 including, prior to applying said film of adhesive to said exposed foam surface, the step of
smoothing at least those regions of said exposed foam surface opposite said facing sheet surfaces to obtain essentially flat surfaces corresponding with said facing sheet surfaces.

4. The method of claim 1 including, prior to applying said film of adhesive to said exposed foam surface, the step of
trimming at least those regions of said foam surface opposite said facing sheet surfaces to obtain essentially flat surfaces corresponding with said facing sheet surfaces.

5. The method of claim 4 including the step of cleaning said essentially flat surfaces to remove trimmings therefrom prior to applying said film of adhesive.

6. The method of claim 1 including, prior to applying said film of adhesive to said exposed foam surface, the step of
calendering at least those regions of said exposed foam surface opposite said facing sheet to obtain essentially flat surfaces corresponding with said facing sheet surfaces.

7. The method of claim 1 including, prior to applying said film of adhesive to said exposed foam surface, the step of
modifying at least those regions of said exposed foam surface opposite said facing sheet surfaces to provide grooves having essentially smooth bottom surfaces each spaced from said liner sheet at a selected distance and each corresponding with one of said facing sheet surfaces.

8. The method of claim 1 including, prior to applying said film of adhesive to said exposed foam surface, the step of
trimming at least those regions of said exposed foam surface opposite said facing sheet surfaces to provide grooves having essentially smooth bottom surfaces each spaced from said liner sheet at a selected distance and each corresponding with one of said facing sheet surfaces.

9. The method of claim 8 including the step of
cleaning said essentially smooth bottom surfaces to remove trimmings therefrom prior to applying said film of adhesive.

10. The method of claim 1 including, prior to applying said film of adhesive to said exposed foam surface, the step of
calendering at least those regions of said exposed foam surface opposite said facing sheet surfaces to provide grooves having essentially smooth bottom surfaces each spaced from said liner sheet at a selected distance and each corresponding with one of said facing sheet surfaces.

References Cited
UNITED STATES PATENTS

| | | | |
|---|---|---|---|
| 3,199,261 | 8/1965 | Soddy | 156—210 X |
| 3,443,007 | 5/1969 | Hardy | 156—78 X |
| 3,317,363 | 5/1967 | Weber | 156—210 |
| 2,609,315 | 9/1952 | Engel et al. | 156—153 |
| 3,212,956 | 10/1965 | Yoshikawa | 156—210 X |
| 3,404,748 | 10/1968 | Bjorksten | 156—210 X |
| 3,407,110 | 10/1968 | Axelson et al. | 156—77 X |
| 3,360,420 | 12/1967 | Paul et al. | 156—257 X |
| 3,503,934 | 3/1970 | Chilvers | 156—331 X |

CARL D. QUARFORTH, Primary Examiner

E. A. MILLER, Assistant Examiner